(12) United States Patent
Von Novak, III et al.

(10) Patent No.: US 9,871,384 B2
(45) Date of Patent: Jan. 16, 2018

(54) WIRELESS CHARGING OF METAL BACKED ELECTRONIC DEVICES

(71) Applicant: QUALCOMM Incorporated, San Diego, CA (US)

(72) Inventors: William Henry Von Novak, III, San Diego, CA (US); Megan Hansen, Thousand Oaks, CA (US); Seong Heon Jeong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 14/717,307

(22) Filed: May 20, 2015

(65) Prior Publication Data

US 2016/0072302 A1    Mar. 10, 2016

Related U.S. Application Data

(60) Provisional application No. 62/046,758, filed on Sep. 5, 2014.

(51) Int. Cl.
*H01F 27/42* (2006.01)
*H02J 5/00* (2016.01)
(Continued)

(52) U.S. Cl.
CPC ............ *H02J 5/005* (2013.01); *H02J 7/0042* (2013.01); *H02J 17/00* (2013.01); *H02J 50/12* (2016.02); *H02J 7/025* (2013.01)

(58) Field of Classification Search
CPC .. H02J 5/005; H02J 7/025; H02J 50/12; H02J 17/00
(Continued)

(56) References Cited

U.S. PATENT DOCUMENTS 8,319,692 B2    11/2012    Chiang et al.
8,325,094 B2    12/2012    Ayala et al.
(Continued)

FOREIGN PATENT DOCUMENTS

JP    2010278604 A    12/2010
TW    M475107 U    3/2014

OTHER PUBLICATIONS

International Search Report and Written Opinion—PCT/US2015/042720—ISA/EPO—Nov. 3, 2015.

*Primary Examiner* — Jared Fureman
*Assistant Examiner* — Duc M Pham
(74) *Attorney, Agent, or Firm* — Knobbe, Martens, Olson & Bear, LLP (57) ABSTRACT

A method and system for providing wireless power transfer through a metal object by forming a loop conductor from the metal object through a feature or component embedded within the metal object and by replacing portions of the metal object with insulating components. The method and system utilize a recessed channel to install and isolate conductors that are connected to transmitter or receiver circuits and enable wireless power transfer and other communications. The recessed channel creates a loop around at least a portion of the metal object such that the conductor installed therein may form a loop conductor, which may be connected to a source or sink. In some implementations, a logo embedded within the metal object may create a loop formed by the metal object with a current path around the logo, wherein the metal object itself may be configured to operate as the conductor.

33 Claims, 7 Drawing Sheets

(51) Int. Cl.
*H02J 17/00* (2006.01)
*H02J 7/00* (2006.01)
*H02J 50/12* (2016.01)
*H02J 7/02* (2016.01)

(58) Field of Classification Search
USPC .......................................................... 307/104
See application file for complete search history.

(56) References Cited

U.S. PATENT DOCUMENTS

| | | | |
|---|---|---|---|
| 8,922,438 B2* | 12/2014 | Nakano | H01Q 1/2225 343/702 |
| 2010/0210233 A1* | 8/2010 | Cook | H01Q 1/243 455/270 |
| 2013/0009833 A1 | 1/2013 | Kough et al. | |
| 2014/0132462 A1 | 5/2014 | Ying | |
| 2015/0077047 A1* | 3/2015 | Chen | H02J 7/025 320/108 |
| 2015/0137742 A1* | 5/2015 | Tseng | H02J 7/025 320/108 |

* cited by examiner

WIRELESS CHARGING OF METAL BACKED ELECTRONIC DEVICES

CLAIM OF PRIORITY UNDER 35 U.S.C. §119

The present application for patent claims priority to Provisional Application No. 62/046,758 entitled "METHODS AND SYSTEMS FOR WIRELESS CHARGING OF METAL BACKED PHONES" filed Sep. 5, 2014, and assigned to the assignee hereof. Provisional Application No. 62/046,758 is hereby expressly incorporated by reference herein.

TECHNICAL FIELD

The described technology generally relates to wireless power. More specifically, the disclosure is directed to devices, systems, and methods related to transferring wireless power by a wireless power charging system through a metal object, for example the metal back cover of a cellular phone.

BACKGROUND

In wireless power applications, wireless power charging systems may provide the ability to charge and/or power electronic devices without physical, electrical connections, thus reducing the number of components required for operation of the electronic devices and simplifying the use of the electronic device. Such wireless power charging systems may comprise a transmitter coupler and other transmitting circuitry configured to generate a magnetic field that may induce a current in a receiver coupler that may be connected to the electronic device to be charged or powered wirelessly. Similarly, the electronic devices may comprise a receiver coupler and other receiving circuitry configured to generate a current when exposed to a magnetic field. Many of these devices are designed with metal cases or enclosures that could impede wireless power transfer via a magnetic field. There is a need for a system and method for performing wireless power transfer through metal objects to be able to incorporate wireless charging within such devices with metal cases or enclosures.

SUMMARY

The implementations disclosed herein each have several innovative aspects, no single one of which is solely responsible for the desirable attributes of the invention. Without limiting the scope, as expressed by the claims that follow, the more prominent features will be briefly disclosed here. After considering this discussion, one will understand how the features of the various implementations provide several advantages over current wireless charging systems.

One aspect of the invention includes an apparatus for receiving wireless power. The apparatus comprises a metal portion, the metal portion comprising a recessed channel that extends substantially around a portion of the metal portion. The apparatus further comprises at least one conductor placed within the recessed channel. The at least one conductor is configured to form a loop substantially around the portion of the metal portion and form part of a resonant circuit, where the resonant circuit configured to wirelessly receive power.

Another aspect of the invention includes an apparatus for transmitting wireless power. The apparatus comprises a metal portion, the metal portion comprising a recessed channel that extends substantially around a portion of the metal portion. The apparatus further comprises at least one conductor placed within the recessed channel. The at least one conductor is configured to form a loop substantially around the portion of the metal portion and form part of a resonant circuit, where the resonant circuit configured to wirelessly transmit power.

Another aspect of the invention includes an apparatus for wireless power transfer. The apparatus comprises a housing portion configured to physically couple to a back of a portable electronic device, the housing portion having a first dimension. The housing portion comprises a metal portion having a second dimension that is the same size as the first dimension or having a size that covers a majority of the first dimension of the housing portion. At least a portion of the metal portion is configured to form a resonator and wirelessly receive power via a wireless field at a level sufficient for charging or powering the portable electronic device. The housing portion further comprises an electrical connection electrically coupled directly to the metal portion and configured to provide the received power to the portable electronic device.

Another aspect of the invention includes an apparatus for receiving wireless power. The apparatus comprises a metal portion that comprises a graphic or textual representation. The graphic or textual representation is defined by a slot in the metal portion, and the slot is configured to define a current path substantially around a portion of the logo and form a resonator as a part of a resonant circuit. The resonant circuit is configured to wirelessly receive power.

Another aspect of the invention includes an apparatus for receiving wireless power. The apparatus comprises a portion comprising a graphic or textual representation. The graphic or textual representation is defined by a conductor, and the conductor is configured to define a current path substantially within a portion of the graphic or textual representation and form part of a resonant circuit. The resonant circuit is configured to wirelessly receive power.

Another aspect of the invention includes a method for wirelessly receiving power at an apparatus from a transmitter. The method comprises inductively coupling power via a magnetic field generated by the transmitter using a receive circuit. The receive circuit comprises at least one conductor placed within a recessed channel extending substantially around a portion of a metal portion of the apparatus, the at least one conductor configured to form a loop substantially around the portion of the metal portion. The method further comprises powering or charging a load of the apparatus using the inductively coupled power.

An additional aspect of the invention includes a method for wirelessly receiving, at an apparatus, power from a transmitter. The method comprises inductively coupling power via a magnetic field generated by the transmitter via a receive circuit. The receive circuit comprises a non-conductive portion or area having a shape defined by a graphic or textual representation and a metal portion forming a portion of the apparatus, where the metal portion is integrated with the non-conductive portion or area and the shape of the non-conductive portion or area defines a path for electrical current to flow in the metal portion substantially around the shape defined by the graphic or textual representation in response to a voltage induced by the magnetic field. The method further comprises powering or charging a load coupled to the apparatus.

Another aspect of the invention includes an apparatus for wirelessly receiving power from a transmitter. The apparatus comprises means for inductively coupling power via a magnetic field generated by the transmitter. The means for inductively coupling power comprises at least one conductor placed within a recessed channel extending substantially around a portion of a metal portion of the apparatus, the at least one conductor configured to form a loop substantially around the portion of the metal portion. The apparatus further comprises means for powering or charging a load of the apparatus using the inductively coupled power.

An additional aspect of the invention includes an apparatus for wirelessly receiving power from a transmitter. The apparatus comprises means for inductively coupling power via a magnetic field generated by the transmitter. The means for inductively coupling power comprises a non-conductive portion or area having a shape defined by a graphic or textual representation and a metal portion forming a portion of the apparatus, where the metal portion is integrated with the non-conductive portion or area and the shape of the non-conductive portion or area defines a path for electrical current to flow in the metal portion substantially around the shape defined by the graphic or textual representation in response to a voltage induced by the magnetic field. The apparatus further comprises means for powering or charging a load coupled to the apparatus.

Another aspect of the invention includes an apparatus for receiving power from a transmitter. The apparatus includes a metal portion comprising a recessed channel extending substantially around a portion of the metal portion. The apparatus further includes a receive circuit configured to inductively couple power via a magnetic field generated by the transmitter to power or charge a load electrically coupled to the receive circuit, the receive circuit comprising at least one conductor placed within the recessed channel, the at least one conductor configured to form a loop substantially around the portion of the metal portion.

An additional aspect of the invention includes another apparatus for wirelessly receiving power from a transmitter. The apparatus includes a casing and a non-conductive portion or area having a shape defined by a graphic or textual representation. The apparatus further includes a receive circuit comprising a metal portion forming a portion of the casing, the receive circuit configured to inductively couple power via a magnetic field generated by the transmitter to power or charge a load electrically coupled to the receive circuit, the shape of the non-conductive portion or area defining a path for electrical current to flow in the metal portion substantially around the shape defined by the graphic or textual representation in response to a voltage induced by the magnetic field.

Another aspect of the invention includes an additional apparatus for wirelessly receiving power from a transmitter. The apparatus includes a casing and a receive circuit comprising a metal portion and configured to inductively couple power via a magnetic field generated by the transmitter to power or charge a load electrically coupled to the receive circuit, the metal portion shaped to form a graphic or textual representation that defines a path for electrical current to flow substantially within a portion of the graphic or textual representation in response to a voltage induced by the magnetic field generated by the transmitter.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Various aspects of the novel systems, apparatuses, and methods are described more fully hereinafter with reference to the accompanying drawings. The teachings of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless power transfer technologies and system configurations, some of which are illustrated by way of example in the figures and in the following description of the preferred aspects. The detailed description and drawings are merely illustrative of the disclosure rather than limiting, the scope of the disclosure being defined by the appended claims and equivalents thereof.

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

The terminology used herein is for the purpose of describing particular implementations only and is not intended to be limiting of the disclosure. It will be understood by those within the art that if a specific number of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive coupler" to achieve power transfer.

Figure 1:
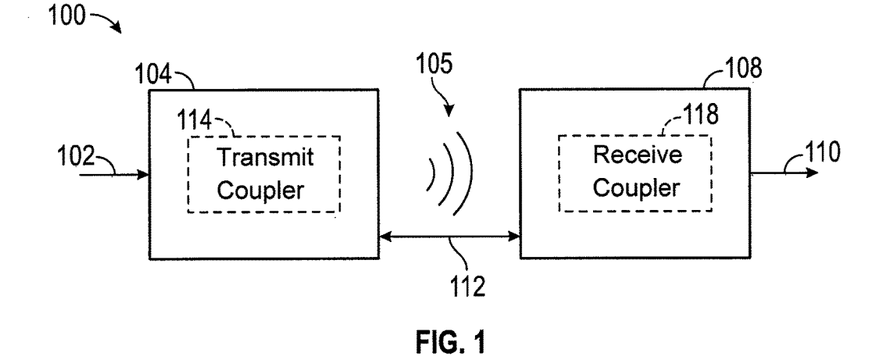
FIG. 1 is a functional block diagram of a wireless power transfer system, in accordance with one exemplary implementation.

FIG. 1 is a functional block diagram of a wireless power transfer system 100, in accordance with one exemplary implementation. Input power 102 is provided to a transmit coupler 114 of a transmitter 104 from a power source (not shown in this figure) to generate a wireless (e.g., magnetic or electromagnetic) field 105 for performing energy transfer. A receive coupler 118 of a receiver 108 couples to the wireless field 105 and generates an output power 110 for storing or consumption by a device (not shown in this figure) coupled to the output power 110. Both the transmitter 104 and the receiver 108 are separated by a distance 112.

The receiver 108 may wirelessly receive power when the receive coupler 118 is located in the wireless field 105 generated by the transmit coupler 114. The transmit coupler 114 of the transmitter 104 may transmit energy to the receive coupler 118 via the wireless field 105. The receive coupler 118 of the receiver 108 may receive or capture the energy transmitted from the transmitter 104 via the wireless field 105. The wireless field 105 corresponds to a region where energy output by the transmit coupler 114 may be captured by the receive coupler 118. In some implementations, the wireless field 105 may correspond to the "near-field" of the transmitter 104. The "near-field" may correspond to a region in which there are strong reactive fields resulting from the currents and charges in the transmit coupler 114 that minimally radiate power away from the transmit coupler 114 in the far field. The near-field may correspond to a region that is within about one wavelength (or a fraction thereof) of the transmit coupler 114.

In one exemplary implementation, the wireless field 105 may be a magnetic field and the transmit coupler 114 and the receive coupler 118 are configured to inductively transfer power. The transmit coupler and the receive coupler 118 may further be configured according to a mutual resonant relationship. When the resonant frequency of the receive coupler 118 and the resonant frequency of the transmit coupler 114 are substantially the same or very close, transmission losses between the transmitter 104 and the receiver 108 are reduced. Resonant inductive coupling techniques may thus allow for improved efficiency and power transfer over various distances and with a variety of coupler configurations. When configured according to a mutual resonant relationship, in an implementation, the transmitter 104 outputs a time varying magnetic field with a frequency corresponding to the resonant frequency of the transmit coupler 114. When the receive coupler 118 is within the wireless field 105, the time varying magnetic field may induce a current in the receive coupler 118. When the receive coupler 118 is configured to resonate at the frequency of the transmit coupler 114, energy may be more efficiently transferred. The alternating current (AC) induced in the receive coupler 118 may be rectified to produce direct current (DC) that may be provided to charge or to power a load (not shown).

Figure 2:
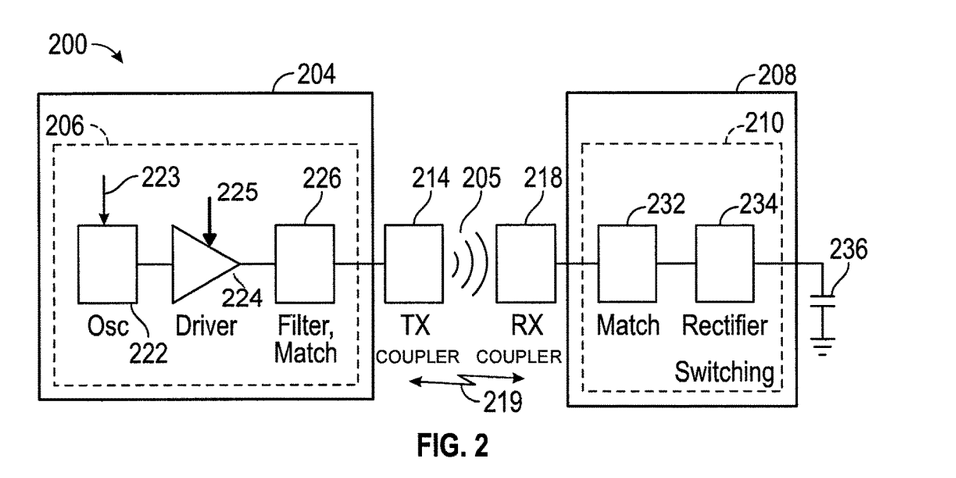
FIG. 2 is a functional block diagram of a wireless power transfer system, in accordance with another exemplary implementation.

FIG. 2 is a functional block diagram of a wireless power transfer system 200, in accordance with an exemplary implementation. The system 200 includes a transmitter 204 and a receiver 208. The transmitter 204 includes transmit circuitry 206 that includes an oscillator 222, a driver circuit 224, and a filter and matching circuit 226. The oscillator 222 may be configured to generate a signal at a desired frequency that is adjusted in response to a frequency control signal 223. The oscillator 222 provides the oscillator signal to the driver circuit 224. The driver circuit 224 is configured to drive a transmit coupler 214 at, for example, a resonant frequency of the transmit coupler 214 based on an input voltage signal (VD) 225. The driver circuit 224 may be a switching amplifier configured to receive a square wave from the oscillator 222 and output a sine wave or square wave.

The filter and matching circuit 226 filters out harmonics or other unwanted frequencies and matches the impedance of the transmitter 204 to the transmit coupler 214. The transmit coupler 214 may generate a wireless field 205 to wirelessly output power at a level sufficient for charging a battery 236.

The receiver 208 includes receive circuitry 210 that includes a matching circuit 232 and a rectifier circuit 234. The matching circuit 232 may match the impedance of the receive circuitry 210 to the receive coupler 218. The rectifier circuit 234 may generate a direct current (DC) power output from an alternate current (AC) power input to charge the battery 236. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

Figure 3:
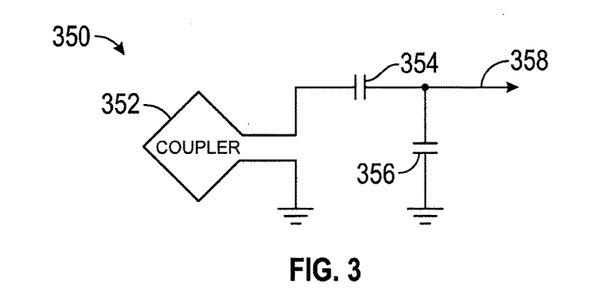
FIG. 3 is a schematic diagram of a portion of transmit circuitry or receive circuitry of FIG. 2 including a transmit or receive coupler, in accordance with exemplary implementations.

FIG. 3 is a schematic diagram of a portion of transmit circuitry 206 or receive circuitry 210 of FIG. 2, in accordance with exemplary implementations. As illustrated in FIG. 3, the transmit or receive circuitry 350 may include a coupler 352. The coupler 352 may also be referred to herein or be configured as a "magnetic" coupler or an induction coil. The term "coupler" generally refers to a component that wirelessly outputs or receives energy for coupling to another "coupler." The coupler 352 may also be referred to as a coil or inductor of a type that is configured to wirelessly output or receive power. As used herein, the coupler 352 is an example of a "power transfer component" of a type that is configured to wirelessly output and/or receive power. The coupler 352 may include an air core or a physical core such as a ferrite core (not shown in this figure).

The coupler 352 may form a portion of a resonant circuit configured to resonate at a resonant frequency. The resonant frequency of the loop or magnetic coupler 352 is based on the inductance and capacitance. Inductance may be simply the inductance created by the coupler 352, whereas, a capacitor may be added to create a resonant structure at a desired resonant frequency. As a non-limiting example, a capacitor 354 and a capacitor 356 are added to the transmit or receive circuitry 350 to create a resonant circuit that resonates at a desired frequency of operation. Accordingly, for larger diameter couplers, the size of capacitance needed to sustain resonance may decrease as the diameter or inductance of the loop increases. Other resonant circuits formed using other components are also possible.

As another non-limiting example, a capacitor (not shown) may be placed in parallel between the two terminals of the circuitry 350. For transmit couplers, a signal 358, with a frequency that substantially corresponds to the resonant frequency of the coupler 352, may be an input to the coupler 352. For receive couplers, the signal 358, with a frequency that substantially corresponds to the resonant frequency of the coupler 352, may be an output from the coupler 352.

Figure 4:
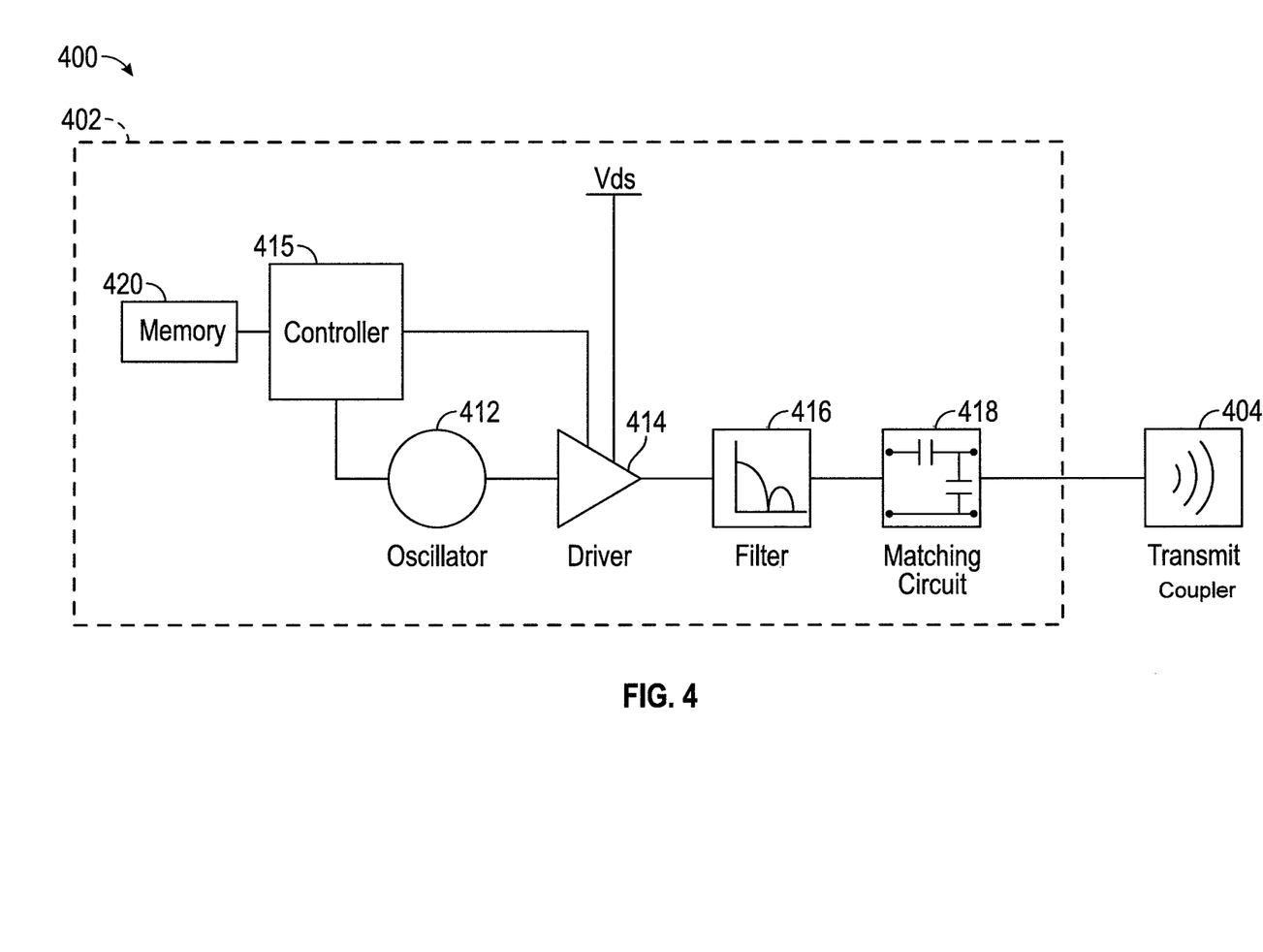
FIG. 4 is a simplified functional block diagram of a transmitter that may be used in an inductive power transfer system, in accordance with exemplary implementations of the invention.

FIG. 4 is a simplified functional block diagram of a transmitter 400 that may be used in an inductive power transfer system, in accordance with exemplary implementations of the invention. The transmitter 400 includes transmit circuitry 402 and a transmit coupler 404 operably coupled to the transmit circuitry 402. In some implementations, the transmit coupler 404 is configured as the transmit coupler 214 as described above in reference to FIG. 2. In some implementations, the transmit coupler 404 is or may be referred to as a coil (e.g., an induction coil). In other implementations the transmit coupler 404 is associated with a larger structure, such as a table, mat, lamp, or other stationary configuration. In an exemplary implementation, the transmit coupler 404 is configured to generate an electromagnetic or magnetic field within a charging region. In an exemplary implementation, the transmit coupler 404 is configured to transmit power to a receiver device within the charging region at a power level sufficient to charge or power the receiver device.

The transmit circuitry 402 may receive power through a number of power sources (not shown). The transmit circuitry 402 may include various components configured to drive the transmit coupler 404. In some exemplary implementations, the transmit circuitry 402 may be configured to adjust the transmission of wireless power based on the presence and constitution of the receiver devices as described herein. As such, the transmit circuitry 402 may provide wireless power efficiently and safely.

The transmit circuitry 402 includes a controller 415. In some implementations, the controller 415 may be a microcontroller or a processor. In other implementations, the controller 415 may be implemented as an application-specific integrated circuit (ASIC). The controller 415 may be operably connected, directly or indirectly, to each component of the transmit circuitry 402. The controller 415 may be further configured to receive information from each of the components of the transmit circuitry 402 and perform calculations based on the received information. The controller 415 may be configured to generate control signals for each of the components that may adjust the operation of that component. As such, the controller 415 may be configured to adjust the power transfer based on a result of the calculations performed by it.

The transmit circuitry 402 may further include a memory 420 operably connected to the controller 415. The memory 420 may comprise random-access memory (RAM), electrically erasable programmable read only memory (EEPROM), flash memory, or non-volatile RAM. The memory 420 may be configured to temporarily or permanently store data for use in read and write operations performed by the controller 415. For example, the memory 420 may be configured to store data generated as a result of the calculations of the controller 415. As such, the memory 420 allows the controller 415 to adjust the transmit circuitry 402 based on changes in the data over time.

The transmit circuitry 402 may further include an oscillator 412 operably connected to the controller 415. In some implementations, the oscillator 412 is configured as the oscillator 222 as described above in reference to FIG. 2. The oscillator 412 may be configured to generate an oscillating signal at the operating frequency of the wireless power transfer. For example, in some exemplary implementations, the oscillator 412 is configured to operate at the 6.78 MHz ISM frequency band. The controller 415 may be configured to selectively enable the oscillator 412 during a transmit phase (or duty cycle). The controller 415 may be further configured to adjust the frequency or a phase of the oscillator 412 which may reduce out-of-band emissions, especially when transitioning from one frequency to another. As described above, the transmit circuitry 402 may be configured to provide an amount of charging power to the transmit coupler 404, which may generate energy (e.g., magnetic flux) about the transmit coupler 404.

The transmit circuitry 402 further includes a driver circuit 414 operably connected to the controller 415 and the oscillator 412. The driver circuit 414 may be configured as the driver circuit 224 as described above in reference to FIG. 2. The driver circuit 414 may be configured to drive the signals received from the oscillator 412, as described above.

The transmit circuitry 402 may further include a low pass filter (LPF) 416 operably connected to the transmit coupler 404. The low pass filter 416 may be configured as the filter portion of the filter and matching circuit 226 as described above in reference to FIG. 2. In some exemplary implementations, the low pass filter 416 may be configured to receive and filter an analog signal of current and an analog signal of voltage generated by the driver circuit 414. In some implementations, the low pass filter 416 may alter a phase of the analog signals. The low pass filter 416 may cause the same amount of phase change for both the current and the voltage, canceling out the changes. In some implementations, the controller 415 may be configured to compensate for the phase change caused by the low pass filter 416. The low pass filter 416 may be configured to reduce harmonic emissions to levels that may prevent self-jamming. Other exemplary implementations may include different filter topologies, such as notch filters that attenuate specific frequencies while passing others.

The transmit circuitry 402 may further include a fixed impedance matching circuit 418 operably connected to the low pass filter 416 and the transmit coupler 404. The matching circuit 418 may be configured as the matching portion of the filter and matching circuit 226 as described above in reference to FIG. 2. The matching circuit 418 may be configured to match the impedance of the transmit circuitry 402 (e.g., 50 ohms) to the transmit coupler 404. Other exemplary implementations may include an adaptive impedance match that may be varied based on measurable transmit metrics, such as the measured output power to the transmit coupler 404 or a DC current of the driver circuit 414.

The transmit circuitry 402 may further comprise discrete devices, discrete circuits, and/or an integrated assembly of components.

Transmit coupler 404 may be implemented as an antenna strip with the thickness, width and metal type selected to keep resistive losses low. In one implementation, the transmit coupler 404 can generally be configured for association with a larger structure such as a table, mat, lamp or other less portable configuration. In an exemplary application where the transmit coupler 404 may be larger in size relative to the receive coupler, the transmit coupler 404 will not necessarily need a large number of turns to obtain a reasonable inductance to form a portion of a resonant circuit tuned to a desired operating frequency.

Figure 5:
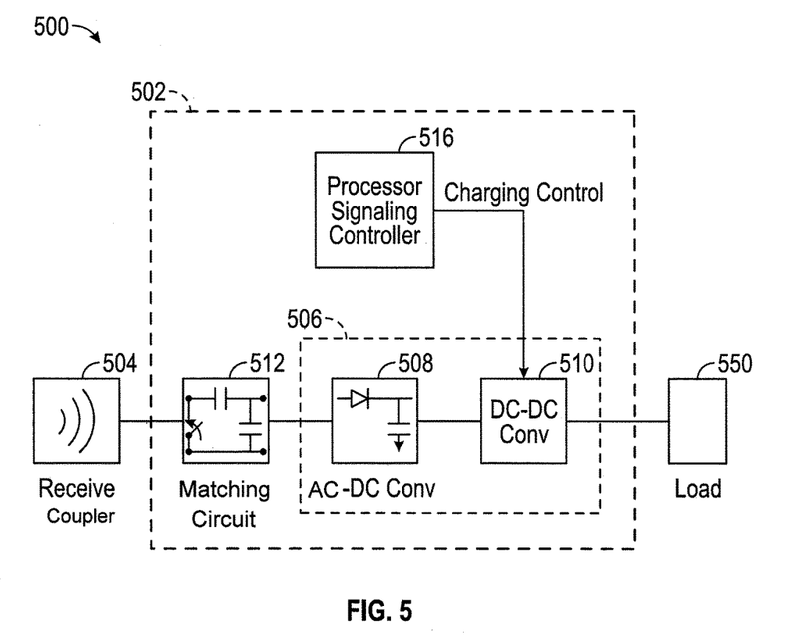
FIG. 5 is a simplified functional block diagram of a receiver that may be used in the inductive power transfer system, in accordance with exemplary implementations of the invention.

FIG. 5 is a block diagram of a receiver that may be used in the inductive power transfer system, in accordance with an implementation. A receiver 500 includes a receive circuitry 502, a receive coupler 504, and a load 550. The receive circuitry 502 is electrically coupled to the load 550 for providing received charging power thereto. It should be noted that receiver 500 is illustrated as being external to load 550 but may be integrated into load 550. The receive coupler 504 is operably connected to the receive circuitry 502. The receive coupler 504 may be configured as the receive coupler 218 as described above in reference to FIG. 2/FIG. 3. In some implementations, the receive coupler 504 may be tuned to resonate at a frequency similar to a resonant frequency of the transmit coupler 404, or within a specified range of frequencies, as described above. The receive coupler 504 may be similarly dimensioned with transmit coupler 404 or may be differently sized based upon the dimensions of the load 550. The receive coupler 504 may be configured to couple to the magnetic field generated by the transmit coupler 404, as described above, and provide an amount of received energy to the receive circuitry 502 to power or charge the load 550.

The receive circuitry 502 is operably coupled to the receive coupler 504 and the load 550. The receive circuitry may be configured as the receive circuitry 210 as described above in reference to FIG. 2. The impedance presented to the receive coupler 504 by the receive circuitry 502 may be configured to match an impedance of the receive coupler 504 (e.g., via a matching circuit 512), which increase efficiency. The receive circuitry 502 may be configured to generate power based on the energy received from the receive coupler 504. The receive circuitry 502 may be configured to provide the generated power to the load 550. In some implementations, the receiver 500 may be configured to transmit a signal to the transmitter 400 indicating an amount of power received from the transmitter 400.

The receive circuitry 502 includes a processor-signaling controller 516 configured to coordinate the processes of the receiver 500.

The receive circuitry 502 includes power conversion circuitry 506 for converting a received energy source into charging power for use by the load 550. The power conversion circuitry 506 includes an AC-to-DC converter 508 coupled to a DC-to-DC converter 510. The AC-to-DC converter 508 rectifies the AC signal from the receive coupler 504 into DC power while the DC-to-DC converter 510 converts the rectified energy signal into an energy potential (e.g., voltage) that is compatible with the load 550. Various AC-to-DC converters 508 are contemplated including partial and full rectifiers, regulators, bridges, doublers, as well as linear and switching converters.

The receive circuitry 502 may further include the matching circuit 512 configured to connect the receive coupler 504 to the power conversion circuitry 506 or alternatively for disconnecting the power conversion circuitry 506 from the receive coupler 504. Disconnecting the receive coupler 504 from the power conversion circuitry 506 may not only suspend charging of the load 550, but also changes the "load" as "seen" by the transmitter 400 (FIG. 4) as is explained more fully below.

The wireless power circuitry described above, and particularly the receive circuitry 502, is intended to be incorporated into a variety of portable electronic devices. Some portable devices may have housings, casings, or other portions that are made of a variety of materials including metal. Metal housing or casing portions may be affected by wireless power transfer. For example, in an inductive charging system, a magnetic field generated by a transmitter 400 (FIG. 4) may induce a voltage on the metal housing portion that generate eddy currents within the metal housing that under certain circumstances that could cause further losses or prevent a receive coupler 504 from coupling to the magnetic field. Certain aspects of various implementations described herein are related to incorporating wireless power circuitry into devices with metal covers/housings/casings while overcoming various challenges associated with the metal covers/housings/casings.

Figure 6A:
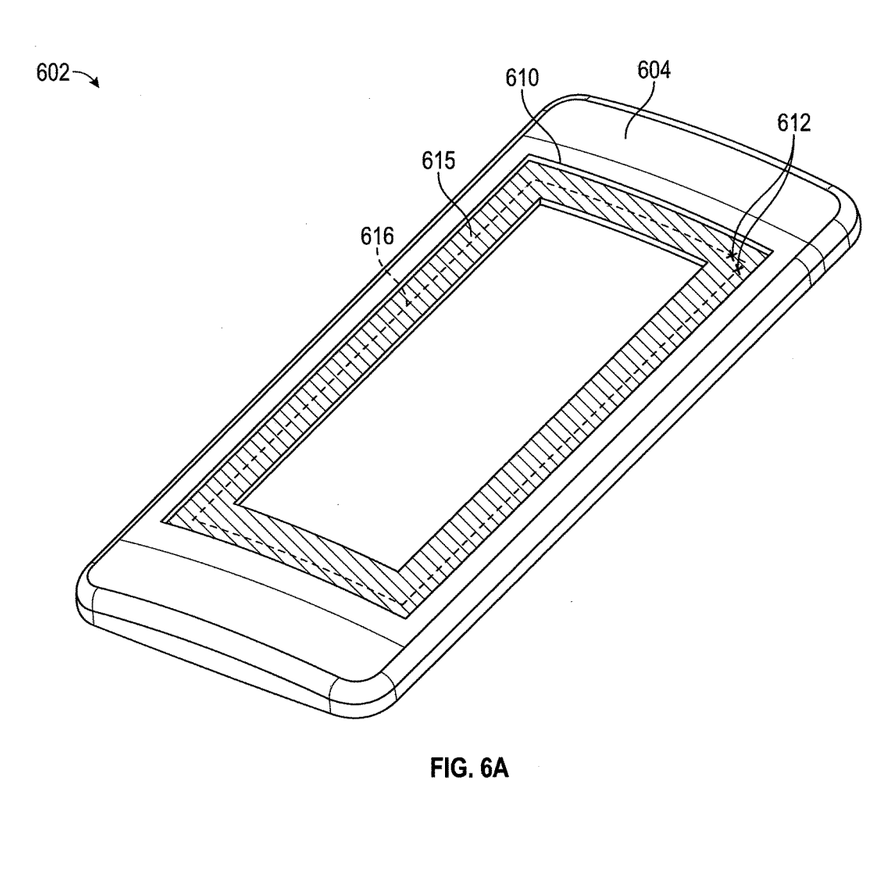
FIG. 6A depicts an isometric view of a metal back cover configured to induce a current on or generate a magnetic field, in accordance with one exemplary implementation.

FIG. 6A depicts an isometric view of a metal back cover 604 having one or more conductors 616 and configured to induce a current on or generate a magnetic field by the one or more conductors 616 placed within a recessed channel 610 of the metal back cover 604, in accordance with one exemplary implementation. The metal back cover 604 shown may be a back cover that physically couples to the back of a portable electronic device 602 (e.g., a cell-phone, a GPS unit, a watch, a mobile media device, a laptop computer, a key fob, or a tablet) or forms the back portion of the portable electronic device 602. For example, the metal back cover 604 may mechanically couple to the back of the portable electronic device 602 and may be configured to protect the internal components of the portable electronic device 602 from exposure or damage. The metal back cover 604 may be mostly metal (e.g., aluminum) but may have other non-metal components as well for various purposes (e.g., holding various portions together or covering ports when not in use). In some implementations, the metal back cover 604 may only be partially metal and may include a majority of a non-metallic substance (e.g., plastic or polyurethane). In some implementations, the device having the metal back cover 604 may embody a portion of the transmitter 400 or receiver 500 as referenced in FIGS. 4 and 5, respectively (or maybe be coupled to the circuitry of the transmitter 400 or receiver 500 as referenced in FIGS. 4 and 5).

As shown in FIG. 6A, the metal back cover 604 may comprise the recessed channel 610 that runs substantially around a portion of the metal back cover 604. In some implementations, for example, the recessed channel 610 may run substantially around the periphery of the outside of the metal back cover 604 or around a periphery of the portion of the outside of the metal back cover 604. In some implementations, the portion of the metal back cover 604 around which the recessed channel 610 runs may exist at the center of the metal back cover 604 or at any other location of the metal back cover 604. In some implementations, the recessed channel 610 may comprise four individual portions that are each connected, thus forming substantially a single recessed channel 610. In some implementations, the recessed channel 610 may be "carved out" of or formed from the metal back cover 604 such that the dimensions (e.g., the thickness, etc.) of the metal back cover 604 are consistent throughout the entire metal back cover 604. In some implementations, the recessed channel 610 may be formed in the metal back cover 604 such that the metal back cover 604 does not have a consistent thickness throughout.

Figure 6B:
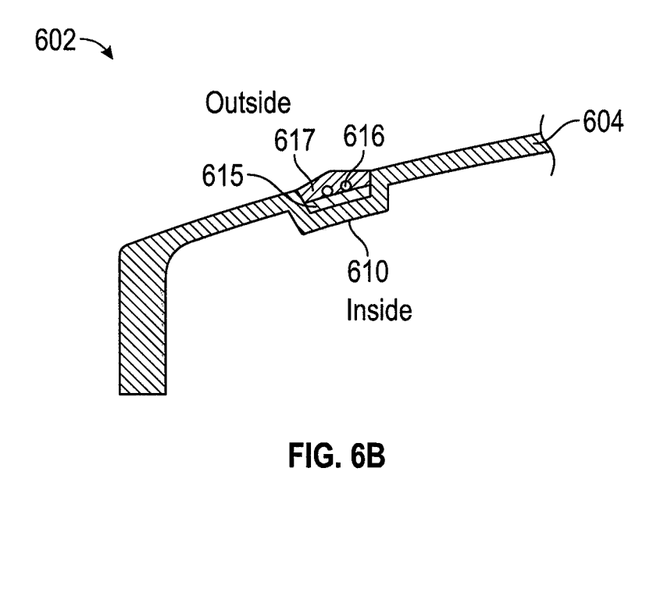
FIG. 6B depicts a portion of a cross-section view of the metal back cover of FIG. 6A, in accordance with an exemplary implementation.
Figure 6C:
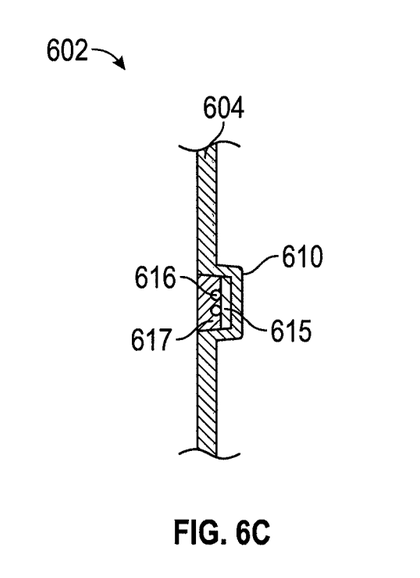
FIG. 6C depicts a portion of another cross-section view of the metal back cover of FIG. 6A, in accordance with an exemplary implementation.

As depicted in FIGS. 6B and 6C, the recessed channels 610 do not necessarily comprise cuts through the metal back cover 604 or portions where the metal back cover 604 is divided into multiple pieces. Having the recessed channel 610 not split the metal back cover 604 into multiple pieces may help maintain the integrity and structural strength of the metal back cover 604. Additionally, the recessed channel 610 may be formed during the molding process of the metal back cover 604 and may not require additional processing of individual pieces or later processing to form the recessed channel 610 in the metal back cover 604. Such a "single-shot" molding process and simplified handing may allow for cheaper designs while maintaining versatility of application of the metal back cover 604. In some implementations, the recessed channel 610 may be created in the metal back cover 604 after the metal back cover 604 is formed, thus allowing for the retrofitting of existing metal back covers 604 with the components described above (ferrite/ferromagnetic substrate 615, conductor 616, and insulating or structural material). Recessed channels 610 allow more flexibility in locating the conductor 616 anywhere along the metal back cover 604. Additionally, detuning of WWAN antennas is greatly minimized by using the existing metal back cover in conjunction with the ferrite/ferromagnetic substrate 615 and the conductor 616. However, in some implementations, the recessed channels 610 may split the metal back cover 604 into a plurality of pieces wherein the ferrite/ferromagnetic substrate 615 acts to electrically couple the individual pieces together or wherein the plurality of pieces are maintained as being individually, electrically isolated. In some implementations, the single recessed channel 610 may comprise an image or a phrase or word, for example a logo or a word or name, as will be discussed further below in relation to FIGS. 7A-7D.

As described above, the recessed channel 610 may be formed substantially around a portion of the metal back cover 604. In some implementations, the recessed channel 610 may be formed such that only a marginal portion of the metal back cover 604 is encompassed by the recessed channel 610. For example, the recessed channel 610 may only encompass a top quarter of the metal back cover 604 or a bottom quarter of the metal back cover 604. Within the recessed channel 610 may be located a ferrite/ferromagnetic substrate 615, a conductor 616 and an insulating or structural material (not shown in this figure). The conductor 616 may be configured to be placed on top of the ferrite/ferromagnetic substrate 615, and then both the ferrite/ferromagnetic substrate 615 and the conductor 616 may both be covered by the insulating or structural material such that a top surface of the recessed channel 610 is level with the surface of the metal back cover 604, as shown in FIG. 6C below. In some implementations, the insulating or structural material may be used within the recessed channel 610 such that the top surface of the insulating or structural material within the recessed channel 610 is below the surface of the metal back cover 604 or extends above the surface of the metal back cover 604, as shown in FIG. 6B below. Furthermore, in some implementations, the conductor 616 may be configured to form part of a resonant circuit.

The recessed channel 610, the ferrite/ferromagnetic substrate 615, the conductor 616 and the insulating or structural material may be configured to form an isolated loop coupler circuit configured to participate in wireless power transfer, either as a receive coupler circuit or as a transmit coupler circuit, similar to the transmitter and receiver circuitry 350 of FIG. 3. The conductor 616 may be configured to operate as a loop coupler in the loop coupler circuit. The conductor 616 may be coupled to a source (not shown in this figure) at feed points 612. While the FIG. 6A depicts the feed points 612 in the top right corner of the recessed channel 610, in some implementations, the feed points 612 may be placed at any location within the recessed channel 610. The source may comprise a current feed or a power source when the conductor 616 is configured to operate as a transmit coupler, or may comprise a receiver when the conductor 616 is configured to operate as a receive coupler.

The conductor 616 may be configured to substantially form a loop around the portion of the metal back cover 604 encompassed by the recessed channel 610. In some implementations, the conductor 616 may comprise a plurality of loops around the recessed channel 610 such that the loop conductor formed by the conductor 616 is a multi-loop conductor. When acting as a receive coupler, the conductor 616 may be configured to generate a current in response to being exposed to a magnetic field (not shown in this figure). This current may be transferred to the receive circuit (not shown in this figure) to which the conductor 616 is connected via feed points 612. When acting as a transmit coupler, the conductor 616 may be configured to generate a magnetic field (not shown in this figure) to transmit wireless power when receiving a current from the transmit circuit (not shown in this figure). In some implementations, the conductor 616 may be configured to couple to other receive/transmit circuits, for example, NFC circuits, Bluetooth circuits, and Wi-Fi circuits, etc. The ferrite/ferromagnetic substrate 615 may be configured to electrically isolate the conductor 616 from the metal back cover 604. Additionally, the ferrite/ferromagnetic substrate 615 may act to intensify the magnetic field seen by the conductor 616 when operating as a receive resonator, and thus, may increase mutual inductance between a transmit resonator and the conductor 616. The insulating or structural material may be configured to insulate the conductor 616 from external objects and maintain the positioning of the conductor 616 within the recessed channel 610. Additionally, the insulating or structural material may be configured to isolate the conductor 616 from the metal back cover 604. In some implementations, the insulating or structural material may be configured to be of a specific color or clear in order to reduce adverse impact to the aesthetics of the metal back cover 604. In some implementations, a plurality of conductors 616 may be placed within the recessed channel 610, wherein each conductor 616 of the plurality of conductors 616 may be configured to operate as a coupler for a different transmit/receive circuit, for example if there are two individual conductors 616, the first conductor 616 may be configured to operate as a wireless power transfer coupler while the second conductor 616 may be configured to operate as an NFC communication coupler.

FIG. 6B depicts a cross-sectional view of the metal back cover 604 of FIG. 6A having a recessed channel 610 formed therein, in accordance with an exemplary implementation. As shown in FIG. 6B, metal back cover 604 has a recessed channel 610 formed therein on the outer side of the metal back cover 604, wherein the recessed channel 610 causes the thickness of the metal back cover 604 to vary (i.e., the profile of the metal back cover 604 is thicker at the recessed channel 610 than elsewhere in the metal back cover 604). Additionally, within the recessed channel 610 and on the outside of the metal back cover 604 are located the ferrite/ferromagnetic substrate 615, the conductor 616 (either a single conductor 616 with two loops or two individual conductors 616), and the insulating or structural material 617. In some implementations, the insulating or structural material 617 may be a plastic, a rubber, or an epoxy material. Additionally, FIG. 6B depicts an exemplary implementation wherein the insulating or structural material 617 is not flush with the outside surface of the metal back cover 604, instead having a slightly raised profile. In some implementations, as discussed above in relation to FIG. 6A, the insulating or structural material 617 may be flush with the outer surface of the metal back cover 604 or may be recessed from the outer surface of the metal back cover 604.

FIG. 6C depicts a cross-sectional view of the metal back cover 604 of FIG. 6A having a recessed channel 610 formed therein, in accordance with another exemplary implementation and depicting exemplary dimensions. FIG. 6C depicts the same components described above in relation to FIG. 6B. Additionally, FIG. 6C depicts exemplary dimensions for the various components and characteristics of the metal back cover 604. The dimensions provided in FIG. 6C are examples of possible dimensions and are not intended to be limiting. In other implementations, the actual dimensions may be greater than or less than those depicted.

For example, the metal back cover 604 may be 0.80 mm thick. The thickness of the metal forming the recessed channel 610 itself may 0.50 mm, but the recessed channel 610 may have a total recessed amount of 0.80 mm beyond that of the inner surface of the metal back cover. Thus, the thickness of the metal back cover 604 may be 0.80 mm except at the recessed channel 610, where the "thickness" may be 1.60 mm. Additionally, the cross-section of the recessed channel 610 may be trapezoidal, wherein the width of the recessed channel 610 at the outer surface of the metal back cover 604 is 2.00 mm and the width of the recessed channel 610 at the bottom of the recessed channel 610 (narrowest portion) is 1.55 mm. In some implementations, the recessed channel 610 may have a profile of any other shape (e.g., circular, square, etc.). The recessed channel 610 may be 1.30 mm deep from the outer surface of the metal back cover 604.

Within the recessed channel 610 are shown the ferrite/ferromagnetic substrate 615, conductor 616 (or conductors 616), and insulating or structural material 617. The ferrite/ferromagnetic substrate 615 is shown having a thickness of 0.30 mm. Thus, the combined thickness of the metal back cover 604 at the recessed channel 610 (0.50 mm as disclosed above) plus the thickness of the ferrite/ferromagnetic substrate 615 (0.30 mm) puts the conductor 616 flush with the inner surface of the metal back cover 604. In some implementations, the ferrite/ferromagnetic substrate 615 may be thicker so as to position the conductor 616 closer to the outer surface of the metal back cover 604. In some implementations, the ferrite/ferromagnetic substrate 615 may be thinner so as to position the conductor 616 further from the outer surface of the metal back cover 604. As shown, the resonator inductor 616 may be 0.30 mm in diameter. The remaining volume in the recessed channel 610 may be filled with the insulating or structural material 617. As depicted in FIG. 6C, the insulating or structural material 617 may be flush with the outer surface of the metal back cover 604.

Figure 7A:
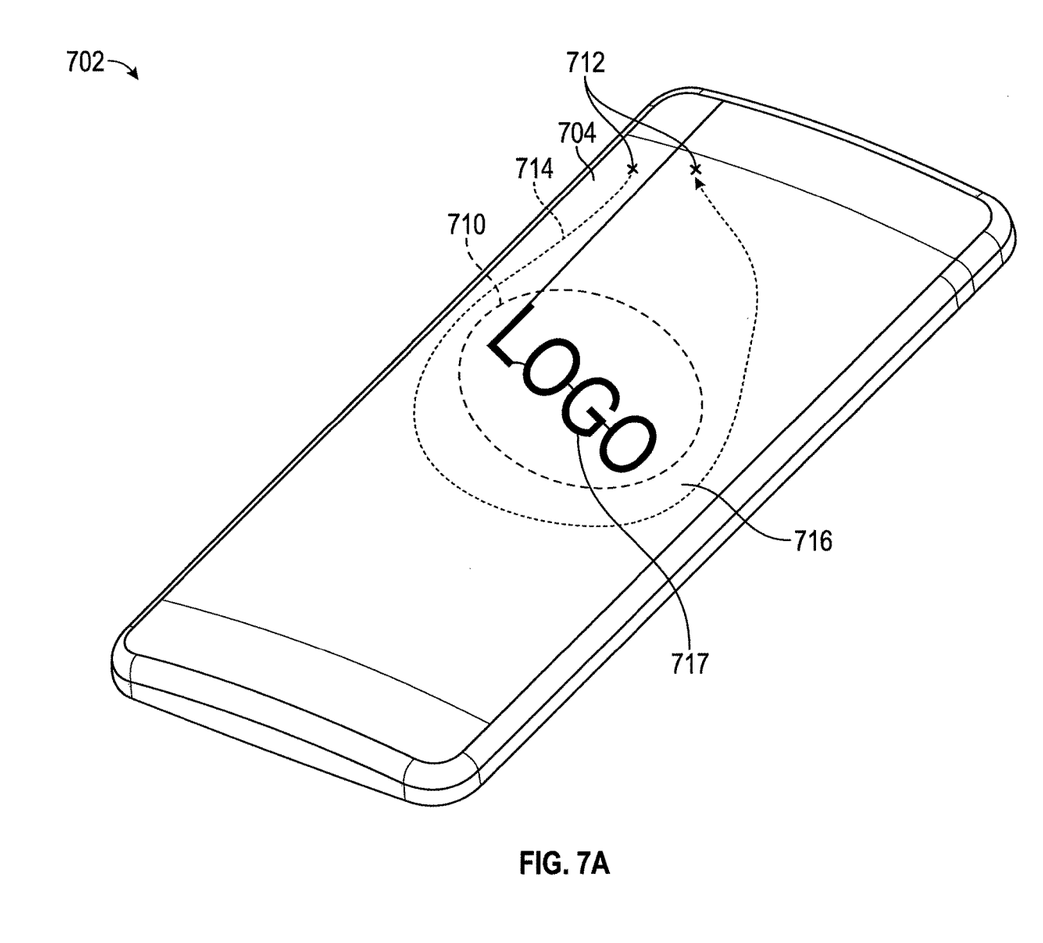
FIG. 7A depicts an isometric view of the metal back cover configured for mutual coupling, in accordance with one exemplary implementation.

FIG. 7A depicts an isometric view of the metal back cover 704 configured for coupling power via a magnetic field, in accordance with one exemplary implementation. The metal back cover 704 may be configured to induce a voltage when exposed to a magnetic field or generate a magnetic field from a directly applied current, in accordance with one exemplary implementation. As discussed above in relation to FIG. 6A, the metal back cover 704 shown may be a back cover that forms a back portion of a portable electronic device 702 (e.g., a cell-phone or a tablet). For example, the metal back cover 704 may mechanically couple to the back of the portable electronic device 702. The metal back cover 704 may be mostly metal (e.g., aluminum) but may have other non-metal components as well for various purposes (e.g., logo, controls, etc.). As shown in FIG. 7A, a portion represents the metal back cover 704 of the portable electronic device 702 (e.g., a cell phone or a media device, etc.). In some implementations, the portable electronic device 702 having the metal back cover 704 may embody a portion of the transmitter 400 or receiver 500 as referenced in FIGS. 4 and 5, respectively (or maybe be coupled to the circuitry of the transmitter 400 or receiver 500 as referenced in FIGS. 4 and 5).

The metal back cover 704 may comprise a logo 710 (e.g., any type of graphic, image, or textual representation/indicia). In some implementations, the logo 710 may be used to form a slot or a recessed channel in the metal back cover 704. The combination of the slot and a portion of the metal back cover 704 or a conductive layer forms a loop substantially around a portion of the metal back cover 704. In some implementations, the slot and the conductor may form a "single-turn" conductive coupler portion 716 from the metal back cover 704. The conductive coupler portion 716 may be used to inductively couple power via a magnetic field. In some implementations, the conductive coupler portion 716 may refer to a metal portion or component that forms a portion of a resonant circuit or that is used for inductive coupling. The conductive coupler portion 716 may comprise any conducting material that may be configured to generate a voltage in response to exposure to a wireless field or configured to generate a wireless field in response to having a current applied. For example, as shown in FIG. 7A, logo 710 may comprise an insulator 717 forming the text "LOGO" on the metal back cover 704 and extending from the "L" of the "LOGO" text to the top edge of the metal back cover 704. The insulator 717 may comprise any material that is configured to not conduct a current signal. The long narrow slot connecting the "L" of the "LOGO" text to the top edge of the metal back cover 704 may create a "loop" around the "LOGO" text that may be used as a turn of the conductive coupler portion 716 formed by the metal back cover 704. Additionally, feed points 712 may comprise the points at which the conductive coupler portion 716 formed by the metal back cover 704 is connected to a transmit circuit or a receive circuit (not shown). The insulator 717 may form slots that extend through the metal back cover 704. The slots formed by the insulator 717 may represent sections where the metal back cover 704 is cut and replaced with an insulator (or other non-conductive material). As noted in FIG. 7A, the individual letters of the text "LOGO" are connected by thin slots of the insulator 717. Accordingly, the text "LOGO" created by the insulator 717 may define the conductive coupler portion 716 from the metal back cover 704 around the logo 710. The arrow 714 may indicate the direction of current flow through the metal back cover 704 when being utilized as a conductive coupler portion 716 around the logo 710 from the first feed point 712 to the second feed point 712. In some implementations, the meal back cover 704 (or a portion thereof) is substantially planar and the insulator 717 combined with the metal back cover 704 form a planar portion of a housing or casing of the device. In some implementations, the insulator 717 and the metal back cover 704 may be integrated into a single housing for the device. In some implementations, the insulator 717 is placed beneath the conductive coupler portion 716.

Figure 7B:
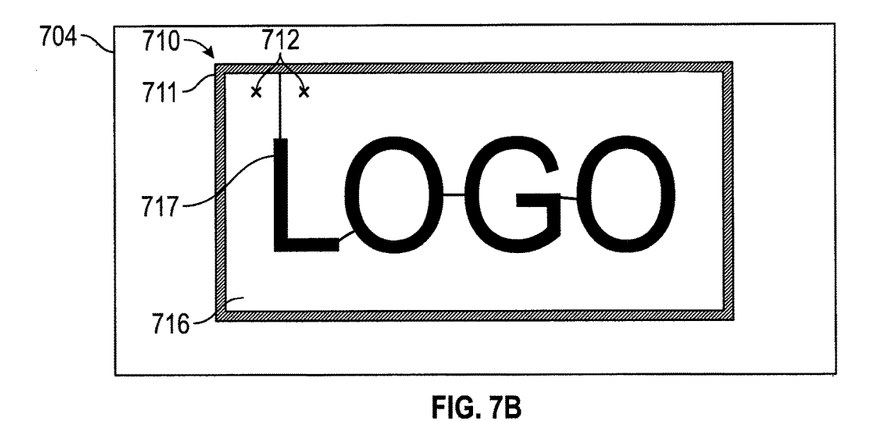
FIG. 7B depicts a top-down view of the logo that may be forming in the metal back cover forming loop around the logo, in accordance with an exemplary implementation.

FIG. 7B depicts a top-down view of the logo 710 that may be formed in the metal back cover 704 forming loop around the logo 710, in accordance with another exemplary implementation. As discussed with reference to FIG. 7A, the logo 710 may define the conductive coupler portion 716 that is configured for mutual coupling by inducing a voltage when exposed to a magnetic field or generating a magnetic field when fed with a directly applied current. In some implementations, the logo 710 may comprise a rectangular border 711, feed points 712, the conductive coupler portion 716, and the insulator 717 that may be configured to form the text "LOGO." The border 711 may be configured as a combination of slots, wherein the slots represent sections where the metal back cover 704 is cut and replaced with an insulator or other similar material. In some implementations, the border 711 may represent the viewable portion of an insulating layer placed between the conductive coupler portion 716 and the metal back cover 704, where the conductive coupler portion 716 is formed from a conductive material layered on top of the metal back cover 704. Accordingly, the conductive coupler portion 716 is electrically isolated from the metal back cover 704. The long narrow slot connecting the "L" of the "LOGO" text to the border 711 may create a "loop" around the "LOGO" text that can be used as the conductive coupler portion 716. Additionally, the slots connecting the individual letters of the "LOGO" text may be used to provide better isolation of the conductive coupler portion 716. As described above in relation to FIG. 7A, the conductive coupler portion 716 may be formed around the insulator 717, wherein a current flows from one feed point 712 around the "LOGO" text formed by insulator 717 and into the second feed point 712 on the opposite side of the "LOGO" text and long narrow slot. Accordingly, in some implementations, the border 711 may be optional and the conductive coupler portion 716 may be part of the metal back cover 704 itself, where the insulator 717 (the "LOGO") may form the single-turn conductive coupler portion 716 from the entire metal back cover 704.

In some implementations, the logo 710 with its border 711, feed points 712, conductive coupler portion 716, and insulator 717 may be combined with the long narrow slot connecting the "L" of the "LOGO" text to an edge of the metal back cover 704. In such an implementation, the long narrow slot may be used to create an additional "loop" around the "LOGO" text that can be used as part of the conductive coupler portion 716, thus creating a multi-turn loop conductor from the metal back cover 704 and the logo 710 when the border 711 allows the metal back cover 704 and the conductive coupler portion 716 to be electrically coupled.

Figure 7C:
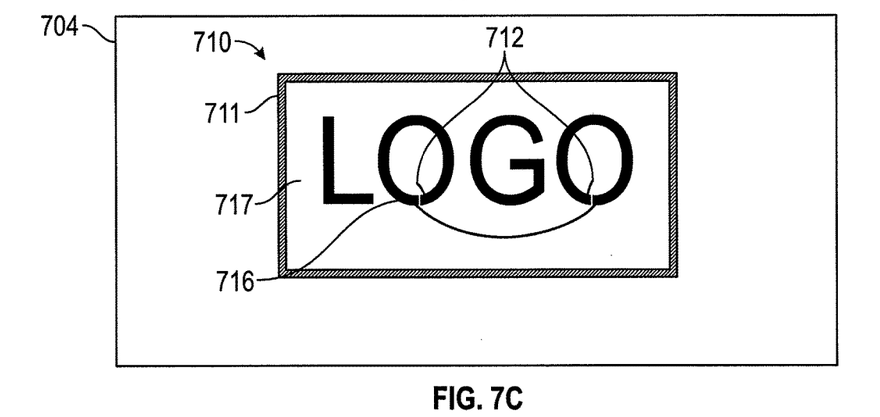
FIG. 7C depicts a top-down view of the logo that may be formed in the metal back cover wherein the logo is a resonator, in accordance with an exemplary implementation.

FIG. 7C depicts a top-down view of the logo 710 that may be formed in the metal back cover 704 wherein the logo 710 is a conductive coupler portion 716, in accordance with another exemplary implementation. In contrast with FIG. 7B, this figure shows a conductive logo 710 within an insulator 717 surrounding it. The logo 710 as depicted in FIG. 7C may include the conductive coupler portion 716 configured for mutual coupling by inducing a current when exposed to a magnetic field or generating a magnetic field (not shown in this figure) when fed with a directly applied current. The logo 710 in FIG. 7C comprises a border 711, the conductive coupler portion 716, and the insulator 717. The insulator 717 may comprise a section of the metal back cover 704 that has been replaced fully with an insulating material such that none of the area covered by the insulator 717 comprises any metal or conductive material or may represent an insulating layer between the metal back cover 704 and the conductive coupler portion 716. The conductive coupler portion 716 may comprise two stubs or feed points 712 where the conductive coupler portion 716 may couple with a transmit or receive circuit. However, as opposed to FIGS. 7A and 7B, in FIG. 7C, the "LOGO" text is formed by the conductive coupler portion 716 as opposed to being formed by the insulator 717. Accordingly, when coupled with the transmit or receive circuit, a current may flow through the conductive coupler portion 716 from one feed point 712, around the "loop" created by a first "O" of the "LOGO" text, then to and around a second "O" of the "LOGO" text before flowing to the other feed point 712. The two "O"s of the "LOGO" text effectively form two individual loops, thus creating a two-turn conductive coupler portion 716.

In some implementations, the logo 710 having the border 711, the conductive coupler portion 716, and the insulator 717 may be embedded in the metal back cover 704 within a recessed portion (not shown in this figure) of the metal back cover 704. In some implementations, the border 711 may be optional. In this implementation, none of the components of the logo 710 may extend through the entire thickness of the metal back cover 704, and instead the logo 710 may be placed within the recessed portion similar to the conductor of FIGS. 6A-6C. The insulator 717 may extend over the entirety of the recessed section and may be configured to isolate the "LOGO" text from the metal back cover 704 as a base on which the conductive coupler portion 716 forming the "LOGO" text is formed. In some implementations, the "LOGO" text of FIG. 7C may be formed in one or more recessed channels as described in relation to FIGS. 6A-6C, wherein the conductive coupler portion 716 forming the "LOGO" text is formed on a ferrite/ferromagnetic substrate (not shown in this figure) and surrounded by an insulator or structural material (not shown in this figure). A current may flow through the conductive coupler portion 716 from a first feed point 712 through the letters of the "LOGO" text to the other feed point 712.

Figure 7D:
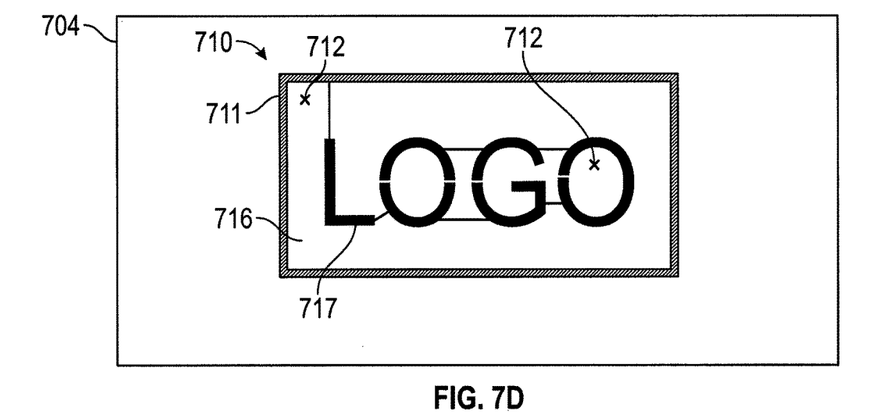
FIG. 7D depicts a top-down view of the metal back cover of FIG. 7A using the logo as a slot with conductive interconnections, in accordance with an exemplary implementation.

FIG. 7D depicts a top-down view of the metal back cover 704 of FIG. 7A using the logo 710 as a slot with conductive interconnections, in accordance with an exemplary implementation. As discussed with reference to FIGS. 7A-7C, the logo 710 may define the conductive coupler portion 716 that is configured for mutual coupling by inducing a voltage when exposed to a magnetic field or generating a magnetic field when fed with a directly applied current. In some implementations, the logo 710 may comprise a rectangular border 711, feed points 712, the conductive coupler portion 716, and the insulator 717 that may be configured to form the text "LOGO." The border 711 may be configured as a combination of slots, wherein the slots represent sections where the metal back cover 704 is cut and replaced with an insulator. Accordingly, the conductive coupler portion 716 may be electrically isolated from the metal back cover 704. The long narrow slot connecting the "L" of the "LOGO" text to the border 711 may create a "loop" of the conductive coupler portion 716 around the "LOGO" text. As described above, the border 711 may be optional, and the conductive coupler portion 716 formed around the "LOGO" text may be formed directly in the metal back cover 704. Additionally, the slots connecting the individual letters of the "LOGO" text may be used to provide better isolation of the conductive coupler portion 716. Furthermore, the strips of the conductive coupler portion 716 used to alter the "LOGO" text in FIG. 7D may be configured to provide an additional half turn, thus forming a one and a half turn resonator. As described above in relation to FIG. 7A, the conductive coupler portion 716 may be formed around the insulator 717. A current may flow from one feed point 712 around the "LOGO" text formed by insulator 717 and through the "O," "G," and "O" of the "LOGO" text to reach the second feed point 712.

Integrating the conductive coupler portion 716 into the LOGO or incorporating the LOGO as an insulating element used to create the conductive coupler portion 716 from the metal back cover may provide minimal esthetic impact while improving the wireless power transfer and communication capabilities of an electronic device comprising a metal cover or enclosure.

While the descriptions of FIGS. 7A-7D are described above in relation to the text "LOGO," the text "LOGO" may be replaced with any other text, image, or other graphical or textual representation or identifier whose integration into the metal back cover may allow for the transmission or reception of wireless power via the metal back cover or a portion thereof. Accordingly, the "LOGO" may comprise any object, device, or element that may be used to associate or advertise a product with a name, company, or other entity.

The various operations of methods performed by the apparatus or system described above may be performed by any suitable means capable of performing the operations, such as various hardware and/or software component(s), circuits, and/or module(s). Generally, any operations or components illustrated in the Figures may be performed or replaced by corresponding functional means capable of performing the operations of the illustrated components. For example, a means for inductively coupling may comprise a metal back cover 604 (FIG. 6) comprising a recessed channel extending substantially around a portion of the metal portion. In some implementations, the means for inductively coupling may comprise a conductor 616 placed within a recessed channel 610, the conductor configured to form a loop substantially around a portion of the metal back cover 604. In some implementations, the means for inductively coupling power via the magnetic field may include a receive coupler 504 (FIG. 5) that may include an outer portion of a metal back cover 604. Furthermore, means for powering or charging a load may include receive circuitry 502 (FIG. 5).

For example, a means for inductively coupling may comprise a metal back cover 704 (FIG. 7) or a conductive coupler portion 716. In some implementations, the means for inductively coupling comprises a logo 710. In some implementations, the means for inductively coupling power via the magnetic field may include a receive coupler 504 (FIG. 5) that may include an outer portion of a metal back cover 704 or the logo 710 or the conductive coupler portion 716. Furthermore, means for powering or charging a load may include receive circuitry 502 (FIG. 5).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions may not be interpreted as causing a departure from the scope of the implementations of the invention.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above may also be included within the scope of computer readable media. The processor and the storage medium may reside in an ASIC.

For purposes of summarizing the disclosure, certain aspects, advantages and novel features of the inventions have been described herein. It is to be understood that not necessarily all such advantages may be achieved in accordance with any particular implementation of the invention. Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An apparatus for wirelessly receiving power from a transmitter, comprising:
    a metal portion comprising a recessed channel extending substantially around a portion of the metal portion; and
    a receive circuit configured to inductively couple power via a magnetic field generated by the transmitter to power or charge a load electrically coupled to the receive circuit, the receive circuit comprising at least one conductor placed within the recessed channel, the at least one conductor configured to form a loop substantially around the portion of the metal portion.

2. The apparatus of claim 1, further comprising an insulating material placed substantially within the recessed channel and configured to isolate the at least one conductor from the metal portion.

3. The apparatus of claim 2, wherein the insulating material comprises at least one of a plastic, or a rubber, or an epoxy material, or a combination thereof.

4. The apparatus of claim 1, wherein the at least one conductor is further configured to form part of a resonant circuit configured to inductively couple the power via the magnetic field.

5. The apparatus of claim 1, wherein the at least one conductor is configured to generate a current in response to a voltage induced by the magnetic field.

6. The apparatus of claim 1, further comprising a ferromagnetic material placed within the recessed channel as a first layer, wherein the at least one conductor is positioned above the ferromagnetic material within the recessed channel.

7. The apparatus of claim 1, wherein the recessed channel extends substantially around a periphery of the metal portion, and wherein the at least one conductor is configured to form a loop substantially around the periphery of the metal portion within the recessed channel.

8. The apparatus of claim 1, wherein the at least one conductor is configured to form a plurality of loops substantially around the portion of the metal portion within the recessed channel.

9. The apparatus of claim 8, wherein the at least one conductor is configured to form a multi-turn loop conductor within the recessed channel.

10. The apparatus of claim 1, wherein the metal portion is configured as at least a portion of a housing of at least one of a cellular phone, a GPS unit, a watch, a mobile media device, a laptop computer, or a key fob.

11. The apparatus of claim 1, wherein the metal portion is configured as a metal back cover of a portable electronic device.

12. An apparatus for wirelessly receiving power from a transmitter, comprising:
    a receive circuit comprising a metal portion forming a first portion of a casing, the receive circuit configured to inductively couple power via a magnetic field generated by the transmitter to power or charge a load electrically coupled to the receive circuit; and
    a non-conductive portion forming a second portion of the casing, the non-conductive portion comprising:
        a slot having a first end and a second end, and
        a graphic or textual representation,
        wherein the first end extends to an edge of the metal portion and the second end connects to the graphic or textual representation.

13. The apparatus of claim 12, wherein the metal portion is substantially planar and, when integrated with the non-conductive portion, forms a planar portion of the casing of the apparatus.

14. The apparatus of claim 12, wherein the non-conductive portion comprises at least one of a plastic, or a rubber, or an epoxy material, or a combination thereof.

15. The apparatus of claim 12, wherein the non-conductive portion comprising the graphic or textual representation defines a path having a plurality of loops substantially around the metal portion.

16. The apparatus of claim 12, wherein the casing forms a portion of a housing of at least one of a cellular phone, a GPS unit, a watch, a mobile media device, a laptop computer, or a key fob.

17. The apparatus of claim 12, wherein the metal portion is configured as a substantially planar back portion of the casing of a portable electronic device.

18. An apparatus for wirelessly receiving power from a transmitter, comprising:
    a receive circuit comprising:
        a metal portion of a casing, and
        a non-conductive portion of the casing,
    wherein the receive circuit is configured to inductively couple power via a magnetic field generated by the transmitter to power or charge a load electrically coupled to the receive circuit,
    wherein the metal portion forms a graphic or textual representation, in the non-conductive portion of the casing, that defines a path through which an electrical current flows, wherein the electrical current is generated within a portion of the graphic or textual representation in response to a voltage induced by the magnetic field generated by the transmitter.

19. The apparatus of claim 18, further comprising an insulating material placed beneath the metal portion and configured to substantially isolate the metal portion from the casing, wherein the casing comprises a conductive material.

20. The apparatus of claim 19, wherein the insulating material comprises at least one of a plastic, or a rubber, or an epoxy material, or a combination thereof.

21. The apparatus of claim 18, wherein metal portion is configured to generate a current based on exposure to a wireless field.

22. The apparatus of claim 18, wherein the graphic or textual representation is configured to form a plurality of loops.

23. The apparatus of claim 18, wherein the casing forms a portion of a housing of at least one of a cellular phone, a GPS unit, a watch, a mobile media device, a laptop computer, or a key fob.

24. The apparatus of claim 18, wherein the casing is configured to couple to the metal portion and configured to mechanically couple to a portable electronic device.

25. The apparatus of claim 18, wherein the casing is configured as a metal back cover of a portable electronic device.

26. A method for wirelessly receiving power at an apparatus from a transmitter, comprising:
    inductively coupling power via a magnetic field generated by the transmitter via a receive circuit comprising at least one conductor placed within a recessed channel extending substantially around a portion of a metal portion of the apparatus, the at least one conductor configured to form a loop substantially around the portion of the metal portion; and
    powering or charging a load of the apparatus using the inductively coupled power.

27. The method of claim 26, further comprising isolating the at least one conductor from the metal portion via an insulating material placed substantially within the recessed channel.

28. The method of claim 27, wherein the insulating material comprises at least one of a plastic, or a rubber, or an epoxy material, or a combination thereof.

29. The method of claim 26, wherein the at least one conductor is further configured to form part of a resonant circuit configured to inductively couple the power via the magnetic field.

30. The method of claim 26, further comprising generating a current in response to a voltage induced by the magnetic field.

31. A method for wirelessly receiving, at an apparatus, power from a transmitter, comprising:
    inductively coupling power via a magnetic field generated by the transmitter using a receive circuit comprising a metal portion forming a first portion of a casing, the metal portion integrated with a non-conductive portion forming a second portion of the casing, the non-conductive portion comprising a slot having a first end and a second end and a graphic or textual representation, wherein the first end extends to an edge of the metal portion and the second end connects to the graphic or textual representation; and
    powering or charging a load coupled to the receive circuit.

32. The method of claim 31, wherein the metal portion is substantially planar and, when integrated with the non-conductive portion, forms a planar portion of the casing of the apparatus.

33. The method of claim 31, wherein the non-conductive portion comprising the slot and the graphic or textual representation forms a plurality of loops substantially around the metal portion, the plurality of loops defining the path of the electrical current.

* * * * *